United States Patent
Regan et al.

(10) Patent No.: US 10,021,171 B2
(45) Date of Patent: Jul. 10, 2018

(54) ZERO-DOWNTIME CLOUD CONNECTOR UPGRADES

(71) Applicant: Cisco Technology, Inc., San Jose, CA (US)

(72) Inventors: Gregory John Regan, Corrandulla (IE); Andrew John Cooper, Nashua, NH (US)

(73) Assignee: Cisco Technology, Inc., San Jose, CA (US)

(*) Notice: Subject to any disclaimer, the term of this patent is extended or adjusted under 35 U.S.C. 154(b) by 193 days.

(21) Appl. No.: 14/955,323

(22) Filed: Dec. 1, 2015

(65) Prior Publication Data

US 2017/0153885 A1 Jun. 1, 2017

(51) Int. Cl.
*G06F 9/44* (2018.01)
*G06F 9/445* (2018.01)
*H04L 29/08* (2006.01)
*G06F 8/656* (2018.01)

(52) U.S. Cl.
CPC .............. *H04L 67/10* (2013.01); *G06F 8/656* (2018.02); *H04L 67/34* (2013.01)

(58) Field of Classification Search
CPC ... G06F 8/67; G06F 8/65; H04L 67/10; H04L 67/34
See application file for complete search history.

(56) References Cited

U.S. PATENT DOCUMENTS

| 7,814,481 | B1 | 12/2010 | Welder et al. |
| 8,356,296 | B1 | 1/2013 | Welder et al. |
| 8,589,904 | B2 | 11/2013 | Powell et al. |
| 8,782,632 | B1* | 7/2014 | Chigurapati ............. G06F 8/65 717/168 |
| 2012/0137001 | A1* | 5/2012 | Ferris .................... H04W 4/003 709/226 |

(Continued)

OTHER PUBLICATIONS

Sriram Subramanian, "Migrating from 0.7 to 0.8", Apache Kafka, Apache Software Foundation, https://cwiki.apache.org/confluence/display/KAFKA/Migrating+from+0.7 . . . , Apr. 26, 2013, 3 pages.

(Continued)

*Primary Examiner* — S. Sough
*Assistant Examiner* — Timothy P Duncan
(74) *Attorney, Agent, or Firm* — Edell, Shapiro & Finnan, LLC

(57) ABSTRACT

Presented herein are zero-downtime upgrade techniques for cloud connector/extension software components. In particular, an on-premises node that runs a first version of a cloud connector software component, receives a second version of the cloud connector software component from a cloud-based software platform. The second version of the cloud connector software component is installed and initialized at the on-premises node such that the first and second versions of the cloud connector software component run in parallel at the on-premises node. Management of the subscriptions of the on-premises services to the cloud-based software platform is then transferred from the first version of the cloud connector software component to the second version of the cloud connector software component.

20 Claims, 6 Drawing Sheets

(56) References Cited

U.S. PATENT DOCUMENTS

| | | | | |
|---|---|---|---|---|
| 2013/0007772 A1* | 1/2013 | Arcudi | ................ | G06F 11/3692 |
| | | | | 719/320 |
| 2015/0281355 A1* | 10/2015 | Maturana | ............ | H04L 67/1097 |
| | | | | 709/202 |
| 2015/0341445 A1* | 11/2015 | Nikolov | .................. | H04L 67/16 |
| | | | | 709/203 |
| 2017/0099362 A1* | 4/2017 | Almond | .................. | H04L 67/26 |

OTHER PUBLICATIONS

"Software Upgrade Processes Supported by Cisco ASR 1000 Series Routers", Cisco ASR 1000 Series Aggregation Services Routers Software Configuration Guide, OL-16506-17, Chapter 5, May 22, 2015, pp. 5-1 to 5-84.

"Software Upgrade Processes Supported by Cisco ASR 1000 Series Routers", Cisco ASR 1000 Series Aggregation Services Routers Software Configuration Guide, OL-16506-17, Chapter 5, May 22, 2015, pp. 5-85 to 5-167.

"Software Upgrade Processes Supported by Cisco ASR 1000 Series Routers", Cisco ASR 1000 Series Aggregation Services Routers Software Configuration Guide, OL-16506-17, Chapter 5, May 22, 2015, pp. 5-168 to 5-252.

"Windows Update Explained", Microsoft.com, Sep. 2008, 12 pages.

* cited by examiner

US 10,021,171 B2

ZERO-DOWNTIME CLOUD CONNECTOR UPGRADES

TECHNICAL FIELD

The present disclosure relates to cloud extension connector upgrades.

BACKGROUND

Enterprises are increasingly relying upon cloud applications/services to perform various enterprise functions. The use of cloud services requires on-premises applications/services to connect to the cloud services and places unique demands on the enterprise networks. In order to meet these unique demands, network administrators are turning to the use of cloud extensions/connectors to connect the on-premises services to the cloud services. A cloud extension or cloud connector is a software component that runs as an on-premises agent on the entity-side and acts as an interface between the on-premises services and the cloud services.

DESCRIPTION OF EXAMPLE EMBODIMENTS

Overview

Presented herein are zero-downtime upgrade techniques for cloud connector/extension software components. In particular, an on-premises node that runs a first version of a cloud connector software component receives a second version of the cloud connector software component from a cloud-based software platform. The second version of the cloud connector software component is installed and initialized at the on-premises node such that the first and second versions of the cloud connector software component run in parallel at the on-premises node. Management of the subscriptions of the on-premises services to the cloud-based software platform is then transferred from the first version of the cloud connector software component to the second version of the cloud connector software component.

EXAMPLE EMBODIMENTS

Figure 1:
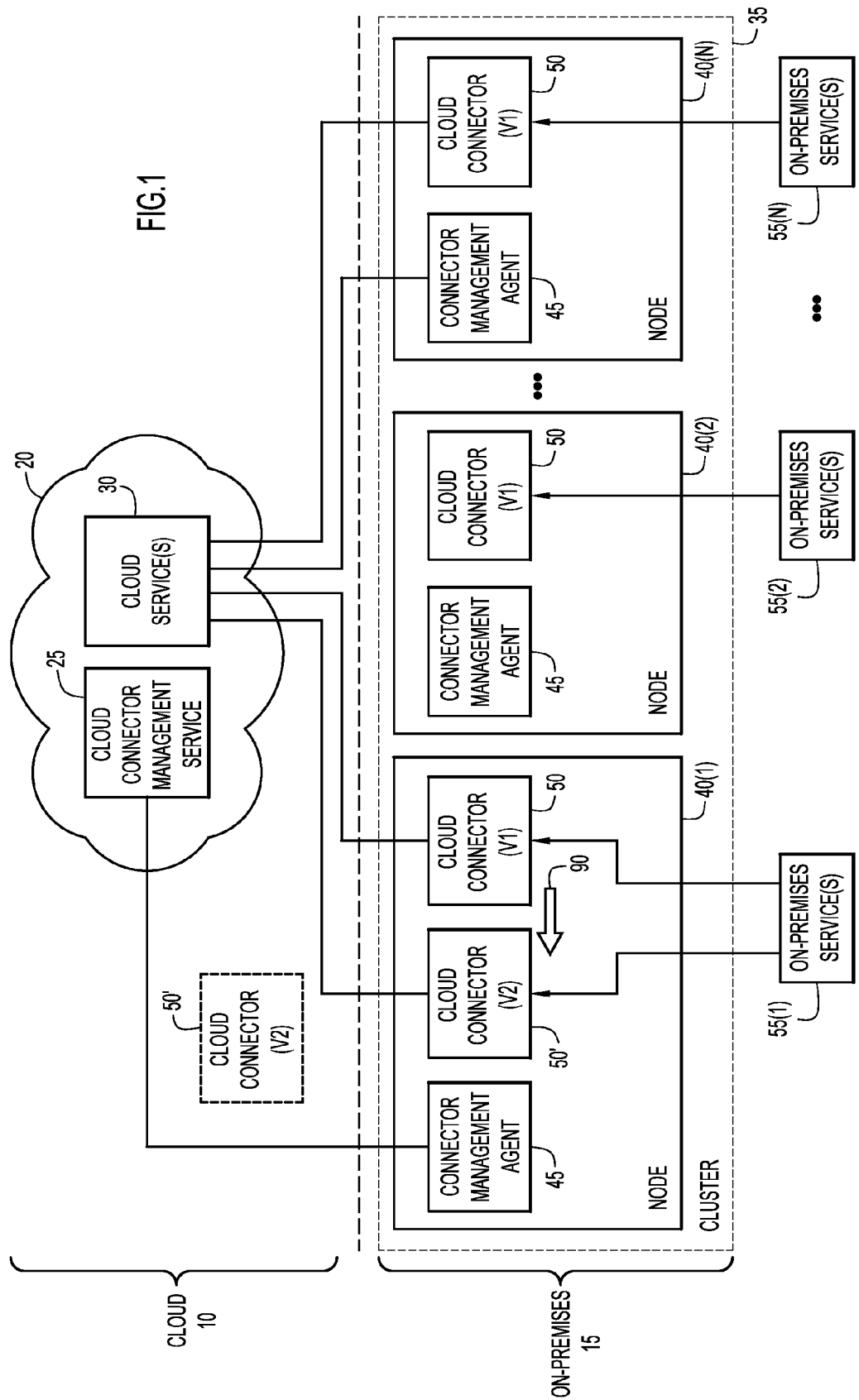
FIG. 1 is block diagram illustrating an arrangement configured to implement zero-downtime upgrade techniques for a cloud connector, according to an example embodiment.

FIG. 1 is a block diagram illustrating an arrangement configured to implement zero-downtime upgrade techniques for cloud connector/extension software components, sometimes referred to simply herein as cloud connectors or cloud extensions, in accordance with examples presented herein. FIG. 1 illustrates a cloud environment 10 and an on-premises environment 15. The cloud environment 10 comprises a cloud-based software platform (cloud) 20 that includes a cloud connector management application/service 25 and one or more cloud applications/services 30. The on-premises environment 15 includes a cluster 35 of nodes 40(1)-40(N) associated with an enterprise computing network. Each node 40(1)-40(N) includes a connector management agent 45 and a cloud connector 50. Each node 40(1)-40(N) is associated with (i.e., connects to) one or more on-premises applicants/services. For ease of illustration, FIG. 1 illustrates only one service 55(1)-55(N) associated with each of the nodes 40(1)-40(N), respectively.

The nodes 40(1)-40(N) are each on-premises computing or networking platforms (e.g., servers, routers, etc.) configured to execute the cloud connector software component. As noted, the cloud connectors 50 are software components that connect the cloud 20 to the on-premises services 55(1)-55(N). In other words, cloud connectors/extensions are designed to bridge an enterprise's cloud users with its on-premises infrastructure.

In general, the cloud connector subscribes to notifications from the on-premises service upon direction from the cloud services. The cloud connector will then act upon notifications received from the on-premises services. For example, a connector could subscribe to notifications from a calendar service, and upon receiving notification of a meeting creation or update, the cloud connector can use that notification to request that the cloud services perform some operation utilizing the notification data. In a further example, a cloud user may need access to an on-premises service from an enterprise's cloud mobile application. In such an example, a cloud connector will receive a request from a cloud service and subscribe user(s) for selected notifications. Notifications from the on-premises service for this user are then routed from the cloud connector up to the cloud service and then onto the cloud mobile application.

In the example of FIG. 1, the cloud services 30 subscribe to the on-premises services 55(1)-55(N). The cloud services 30 and cloud connector management service 25 are responsible for managing the subscriptions on the cloud connectors 40(1)-40(N).

The connector management agents 45 are on-premises software components that run on the nodes 40(1)-40(N) to, for example, install the corresponding cloud connectors 50, generate reports to the cloud 20, etc. The cloud connector management application/service 25 is a software component that communicates with the connector management agents 45. The cloud connector management service 25 manages on-premises installs, upgrades, etc. of the cloud connectors 50 via the corresponding connector management agents 45.

In cloud-based software platforms, such as cloud 20, updates/upgrades to the cloud services 30 occur frequently to, for example, improve performance, correct security issues, etc. In certain examples, there may also be a need to upgrade the on-premises portion of the cloud services (i.e., the cloud connectors) from a current (outdated) version to an upgraded/updated version of the software.

Cloud software is generally stateless and can add/remove servers as required. However, the since cloud connectors extend the cloud services into the on-premises environment, the cloud connectors are typically stateful (i.e., must keep track of user subscriptions to back end services) and any subscriptions managed/services thereby must be migrated as part of upgrade. Additionally, at any given time, there may be active subscriptions that need to be serviced (i.e., the cloud connectors may be in use by the on-premises services). Therefore, presented herein are techniques for updating/upgrading the on-premises cloud connectors in a "manner that has zero operational impact on the cloud connectors (i.e., enables continuous management of cloud subscriptions associated with the on-premises services). In other words, the techniques presented herein, sometimes referred to herein as zero-downtime upgrade techniques, transparently update the cloud connectors under the control of the cloud platform with a seamless migration of state during the upgrade and without any service interruptions (no downtime).

In the example of FIG. 1, the cloud connectors 50 are each a first version, referred to as version 1 (V1), of the cloud connector software component that is initially installed on each of the nodes 40(1)-40(N). The cloud connectors 50 are used for some period of the time to manage subscriptions of the on-premises services 55(1)-55(N) to the cloud services 30. However, at some later time, new features, bug fixes, etc. are introduced, thereby necessitating an upgrade of the cloud connectors 50 from the current version (version) to a second version, referred to as version 2 (V2). For ease of illustration, the updated version of the cloud connector software component is generally referred to as cloud connector 50'.

Figure 2:
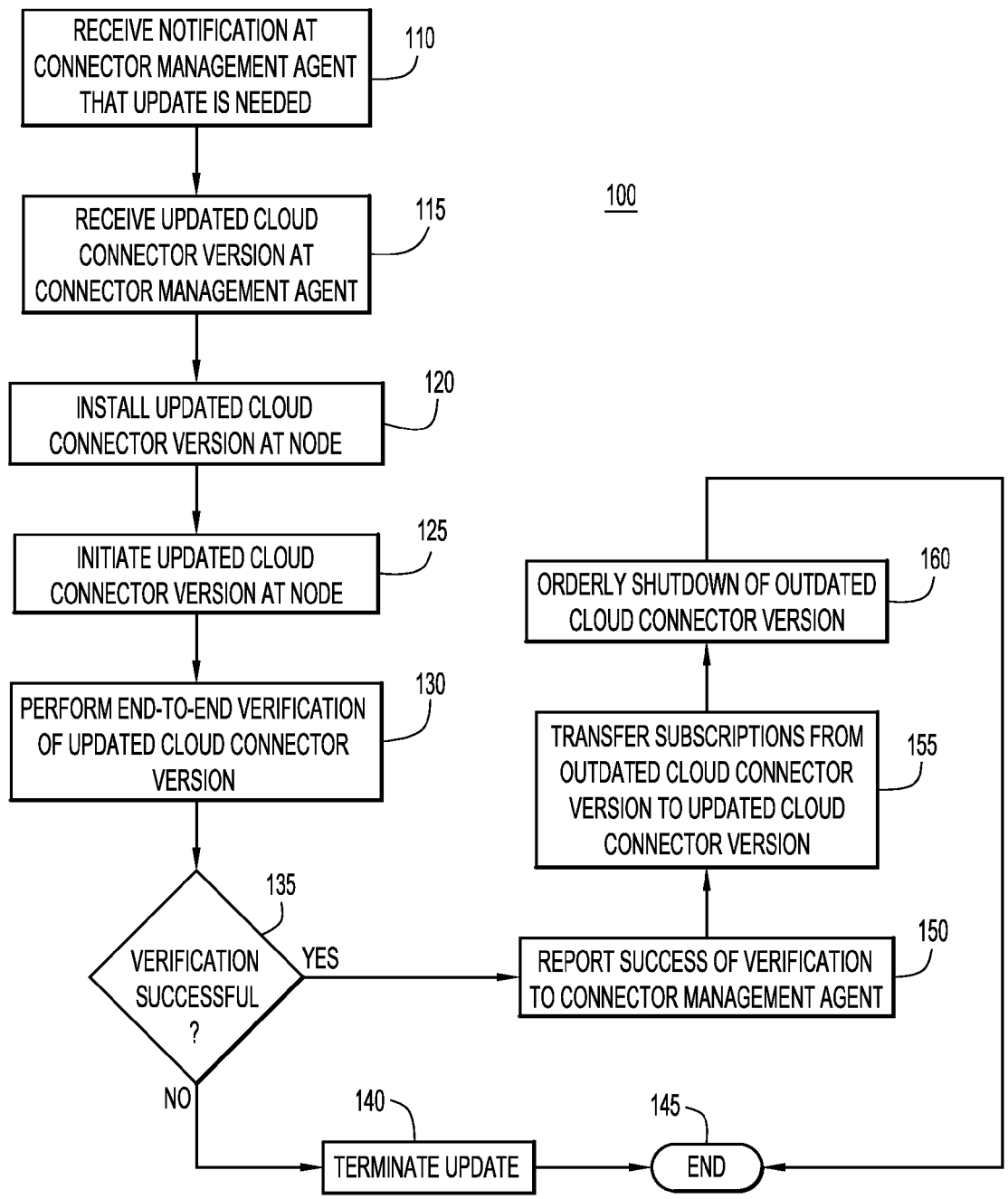
FIG. 2 is a flowchart illustrating a method for performing zero-downtime upgrade techniques for a cloud connector, according to an example embodiment.

FIG. 2 is a detailed flowchart of a method 100 in which the zero-downtime upgrade techniques in accordance with examples presented herein are used to upgrade the first node 40(1) from the current version (version 1) of the cloud connector software component to an updated version (version 2) of the cloud connector software component (i.e., upgrade from cloud connector 50 to cloud connector 50'). The upgrade may be initiated from the cloud 20 as a result of manual administrative intervention at the cloud, automatically initiated at a scheduled time by the cloud connector management service 25 (i.e., a scheduled upgrade), etc. Although the upgrade may be initiated in different manners, the upgrade is managed and controlled by cloud 20. In general, since there is zero-downtime of the cloud connector software, the enterprise and/or the on-premises administrators need not be made aware that an upgrade is occurring or scheduled to occur.

Method 100 begins at 110 where the connector management agent 45 on node 40(1) receives a notification that an update to the cloud connector 50 is required. At 115, the updated version of the cloud connector (i.e., cloud connector 50') is received at the connector management agent 45.

In one example, connector management agent 45 periodically sends a heartbeat message (e.g., a Hypertext Transfer Protocol (HTTP) POST request) to cloud connector management service 25 (e.g., every 30 seconds). Upon receipt of a heartbeat message, the cloud connector management service 25 sends a response (e.g., a POST response) that includes information indicating a version of the cloud connector that node 40(1) should be running. The connector management agent 45 compares an actual version of the cloud connector running on the node 40(1) against the version advertised in the in POST response. If there is a difference, the connector management agent 25 will use an HTTPS link in the POST response to download a new version of the connector from a repository in the cloud 20. The cloud repository is not shown in FIG. 1. In alternative examples, the above heartbeat mechanism using HTTP may be replaced with WebSockets or other communication mechanism.

At 120, the connector management agent 45 installs cloud connector 50' on the node 40(1) and, at 125, the cloud connector 50' is initiated/started. Even though updated cloud connector 50' has been installed and started, the outdated cloud connector 50 continues to operate and manage/process subscriptions of the on-premises services 55(1) to the cloud services 30 (i.e., version 1 remains intact and users are not impacted). As such, for at least a period of time, node 40(1) is configured to run two different version of the cloud connector software component in parallel (i.e., run parallel software instances).

At 130, after cloud connector 50' starts up, the updated version of the cloud connector software component performs an end-to-end verification of itself. As noted above, the cloud connector operates with both the cloud 20 and the on-premises services 55(1). Therefore, end-to-end verification means that the cloud connector 50' has confirmed that it can communicate with both the cloud 20 and the on-premises services 55(1) (i.e., tests the cloud connection and the local connection). At 135, the cloud connector 50' determines if the end-to-end verification was successful. If the end-to-end verification was unsuccessful, then the upgrade to cloud connector 50' is terminated at 140 and the method 100 ends at 145.

In certain examples, the end-to-end verification involves a message from the cloud connector 50' to the cloud service 30 indicating the new cloud connector has initialized and is ready to accept subscriptions. This verification implies that the connector has tested that it can successfully connect to the on-premises service and to the cloud service.

Returning to 135, if the end-to-end verification was successful, then at 150 the cloud connector 50' notifies connector management agent 45 on node 40(1) of the verification success, thereby indicating that the upgrade from cloud connector 50 to cloud connector 50' should continue. At 155, the cloud connector service 25 transfers/migrates subscriptions from cloud connector 50 (i.e., the outdated version) to cloud connector 50' (i.e., the updated version). Additionally, any new subscriptions are routed to the cloud connector 50'. The transfer of subscriptions from cloud connector 50 to cloud connector 50' is shown in FIG. 1 by arrow 90.

As noted, the cloud connector service 25 makes decisions on where users are subscribed. This cloud orchestration allows control over what connector instance is active, enabling a staged two-phase transfer of subscriptions from connector 50 to connector 50'. During transfer of the subscriptions from cloud connector 50 to cloud connector 50', the cloud connector 50 continues to operate and service all requests associated with subscriptions still assigned thereto. After all subscriptions are transferred to cloud connector 50', the connector management agent 45 initiates orderly shutdown of the cloud connector 50. In particular, the connector management agent 45 stops and uninstalls the cloud connector 50. The cloud connector management service 25 may also be notified that the upgrade was successful.

As noted above, each of the nodes 40(1)-40(N) initially runs an outdated version of the cloud connector software component (i.e., cloud connector 50). As such, cloud connectors 50 on nodes 40(2)-40(N) may also be upgraded and replaced with new cloud connector versions as described above with reference to FIG. 2.

Additionally, FIG. 1 illustrates only one on-premises cluster 35. It is to be appreciated that multiple clusters each associated with different enterprises may be present in alternative examples. In such examples, each of the clusters may be upgraded in a similar manner as described with reference to FIGS. 1 and 2. It should be appreciated that the multiple nodes and/or multiple clusters may simultaneously execute the zero-downtime upgrade techniques to upgrade cloud connectors located within each cluster.

In summary, FIGS. 1 and 2 illustrate an example in which a new/upgraded cloud connector is spun up and subscriptions are orderly transferred from an outdated cloud connector to the upgraded connector before the outdated connector is shutdown. The outdated cloud connector is only shutdown after the upgraded cloud connector is fully operational and fully subscribed thereto. If any issues are encountered during this process (e.g., upgraded connector fails to start properly, end-to-end verification fails, etc.), then the cloud terminates installation of the upgraded cloud connector. The outdated connector is left running until the upgrade is completed to ensure no service disruption.

Figure 3:
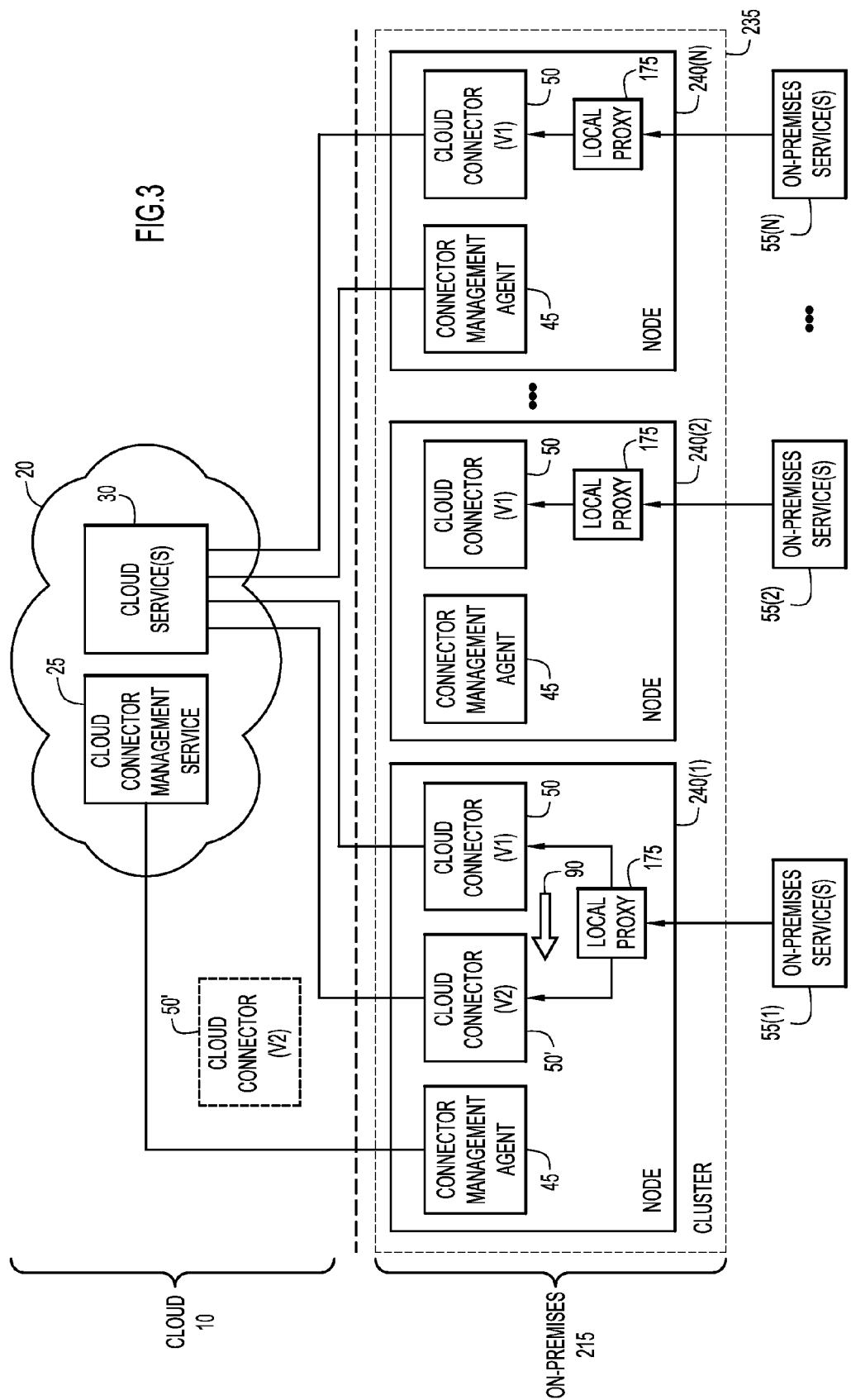
FIG. 3 is block diagram illustrating another arrangement configured to implement zero-downtime upgrade techniques for a cloud connector, according to an example embodiment.

FIGS. 1 and 2 illustrate use of the zero-downtime upgrade techniques in a general arrangement for an on-premises cluster. FIG. 3 illustrates use of the zero-downtime upgrade mechanism in a specific on-premises cluster where the on-premises nodes receive incoming local traffic (i.e., receive inbound traffic from the on-premises services).

More specifically, FIG. 3 illustrates an arrangement that includes the cloud environment 10 shown in FIG. 1. However, the arrangement of FIG. 3 comprises an alternative on-premises environment 215 that includes a cluster 235 of nodes 240(1)-240(N). The nodes 240(1)-240(N) each include a connector management agent 45 and a first version of the cloud connector software component (i.e., cloud connector 50), as described above with reference to FIG. 1. The nodes 240(1)-240(N) also each include a corresponding local proxy 175 that, as described further below, provides an indirection of incoming local traffic to an active cloud connector and can switch between active cloud connectors.

As shown in FIG. 3, each node 240(1)-240(N) is associated with (i.e., connects to) one or more on-premises services. For ease of illustration, FIG. 3 illustrates only one on-premises service 55(1)-55(N) associated with each of the nodes 240(1)-240(N), respectively.

In the example of FIG. 3, the on-premises services 55(1)-55(N) are configured to open a communication pathway (e.g., http port) back to the cloud connectors 50. That is, the cloud connectors 50 are configured to receive and process incoming/inbound communications from the on-premises services 55(1)-55(N). In such arrangements, problems may arise when two cloud connector instances are running on the same node during a connector upgrade in accordance with the zero-downtime upgrade techniques presented herein because only one software instance can monitor (listen to) a designated local network port at any given time. As such, the example of FIG. 3 interposes the proxies 175 at the nodes 240(1)-240(N), where the proxies 175 are each configured to monitor the corresponding local port on behalf of the cloud connector(s). As described further below, these proxies 175 dynamically forward traffic to the correct cloud connector instance during connector upgrades (i.e., redirect the inbound traffic seamlessly between two instances of the cloud connector running on the node during a cloud connector upgrade).

Figure 4:
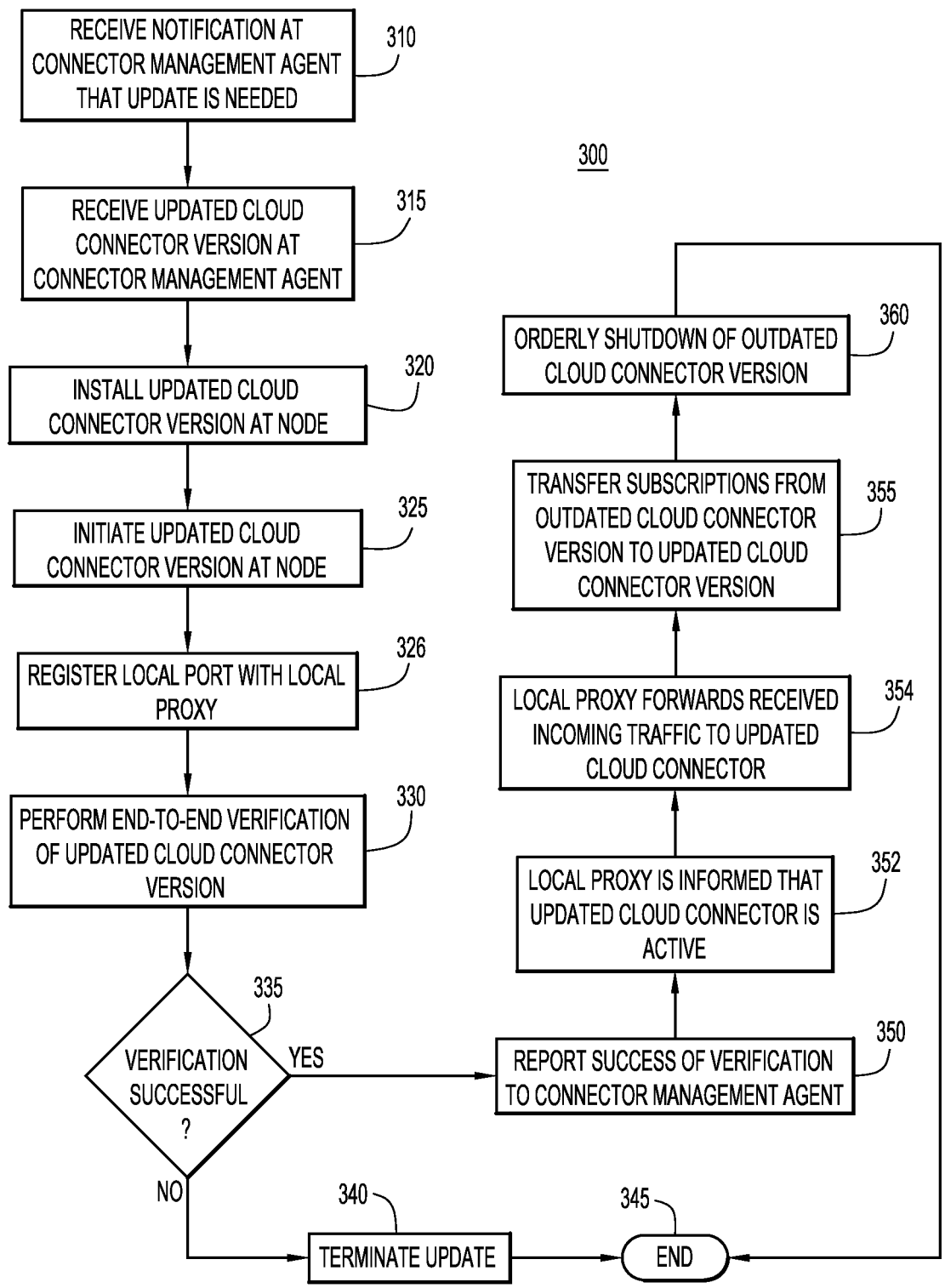
FIG. 4 is a flowchart illustrating another method for performing zero-downtime upgrade techniques for a cloud connector, according to an example embodiment.

FIG. 4 is a detailed flowchart of a method 300 in which the zero-downtime upgrade techniques in accordance with examples presented herein are used to upgrade the first node 240(1) from an outdated version (version 1) of the cloud connector software component (i.e., cloud connector 50) to an updated version (version 2) of the cloud connector software component (i.e., cloud connector 50'). Method 300 includes steps 310, 315, 320, and 325 that are substantially similar to steps 110, 115, 120, and 125, respectively, described above with reference to FIG. 2. Generally, steps 310, 315, 320, and 325 are performed to receive and install the updated version of the cloud connector software component at node 240(1).

At 325, the even though 50' has been installed and started, the outdated cloud connector 50 continues to operate and process subscriptions of the on-premises services 55(1) (i.e., version 1 remains intact and users are no impacted). As such, for at least a period of time, node 240(1) is configured to run different version of the cloud connector software component in parallel (i.e., run parallel software instances). At the same time, the local proxy 175 is running and monitoring the local network port of node 240(1) that receives traffic from the on-premises services 55(1). The local proxy 175 at node 240(1) directs traffic received on the local port to a port registered for the outdated cloud connector 50) (i.e., port LP1). When cloud connector 50' is initiated, the cloud connector agent 45 at node 240(1) assigns a new local proxy port (i.e., port LP2) to the updated cloud connector 50'. That is, cloud connector 50' starts up with a local port number supplied by the cloud connector agent. The cloud connector 50' completes the startup and connects to any external services (e.g., on-premises services 55(1) and cloud services 30) and opens up the local port LP2 for listening.

At 326, the cloud connector 50' registers the new local port with the local proxy 175. This registration can take the form of a local HTTP request to the proxy 175 or it could be an annotation in a local file or database record that is monitored by the proxy.

At 330, after cloud connector 50' starts up, the updated version of the cloud connector software component performs an end-to-end verification of itself. As noted above, the cloud connector 50' operates with both the cloud 20 and the on-premises services 55(1). Therefore, end-to-end verification means that the cloud connector 50' has confirmed that it can communicate with both the cloud services 30 and the on-premises services 55(1) (i.e., tests the cloud connection and the local connection). At 335, the cloud connector 50' determines if the end-to-end verification was successful. If the end-to-end verification was not successful, then the upgrade to cloud connector 50' is terminated at 340 and the method 300 ends at 345.

Returning to 335, if the end-to-end verification was successful, then at 350 the cloud connector 50' notifies connector management agent 45 that the end-to-end verification was successful (i.e. indicates that the upgrade should proceed). At 352, the local proxy 175 is also informed that the cloud connector 50' is the active cloud connector. In response, at 354 the local proxy 175 begins to forward incoming local traffic to the updated cloud connector 50' (i.e., forward traffic to local port LP2).

At 355, following receipt of the notification from the cloud connector 50' indicating that the end-to-end verification was successful, the connector management agent 45 at node 40(1) transfers/migrates subscriptions from cloud connector 50 (i.e., the outdated version) to cloud connector 50' (i.e., the updated version) and new subscriptions are routed to the cloud connector 50'. The transfer of subscriptions from cloud connector 50 to cloud connector 50' is shown in FIG. 3 by arrow 90.

During the subscription transfer process, the cloud connector 50 continues to operate and service all requests associated with subscriptions still assigned thereto. After all subscriptions are transferred to cloud connector 50', the connector management agent 45 initiates an orderly shutdown of the cloud connector 50. In particular, the connector management agent 45 stops and uninstalls the cloud connector 50. The cloud connector management service 25 may also be notified that the upgrade was successful.

It is noted that, if there are multiple subscriptions, during the transfer of those subscriptions, both connectors are effectively active, and the proxy 175 is configured route requests for the appropriate subscription to the correct connector instance. That is, the proxy 175 has intelligent routing capabilities. When the outdated cloud connector 50 shuts down, it will deregister with the local proxy 175 indicating it should no longer receive traffic. The last cloud connector to register with the proxy 175 will automatically become the active connector. In certain examples, when the cloud connector 50' registers, the proxy 175 will send a command to other instances of the cloud connector (i.e., cloud connector 50) to shut down, ensuring that there is only one running and active service after completion of the upgrade.

In the example of FIG. 3, the proxies 175 are local proxies that process inbound local traffic (i.e., traffic originating locally within the premises). In further examples, the proxies may also be configured to process cloud traffic (i.e., traffic originating from the cloud 20) such that the proxies effectively wrap around the nodes 240(1)-240(N). In such examples, the cloud connector versions may be assigned multiple local proxy addresses (e.g., one for local traffic and one for cloud traffic). In examples in which the proxies 175 do not process the cloud traffic, the cloud services 30 need to be aware of which cloud connector version is active and managing subscriptions. However, this version-awareness at the cloud is not needed when the proxies 175 process the cloud traffic as the cloud services 30 send all traffic to the proxies, which are then responsible for maintaining awareness of which cloud connector version is active.

In summary, FIGS. 3 and 4 illustrate an example where a cloud connector running on a node receives inbound local traffic such that, during a cloud connector upgrade, two software instances both listen to a known port on a loopback interface to receive the incoming events from the local proxy. When a cloud connector instance has completed starting up and is ready to receive requests, it registers with the local proxy indicating that it is ready to receive requests. Similarly, when the outdated cloud connector shuts down, it will deregister with the local proxy, indicating it should no longer receive requests.

Figure 5:
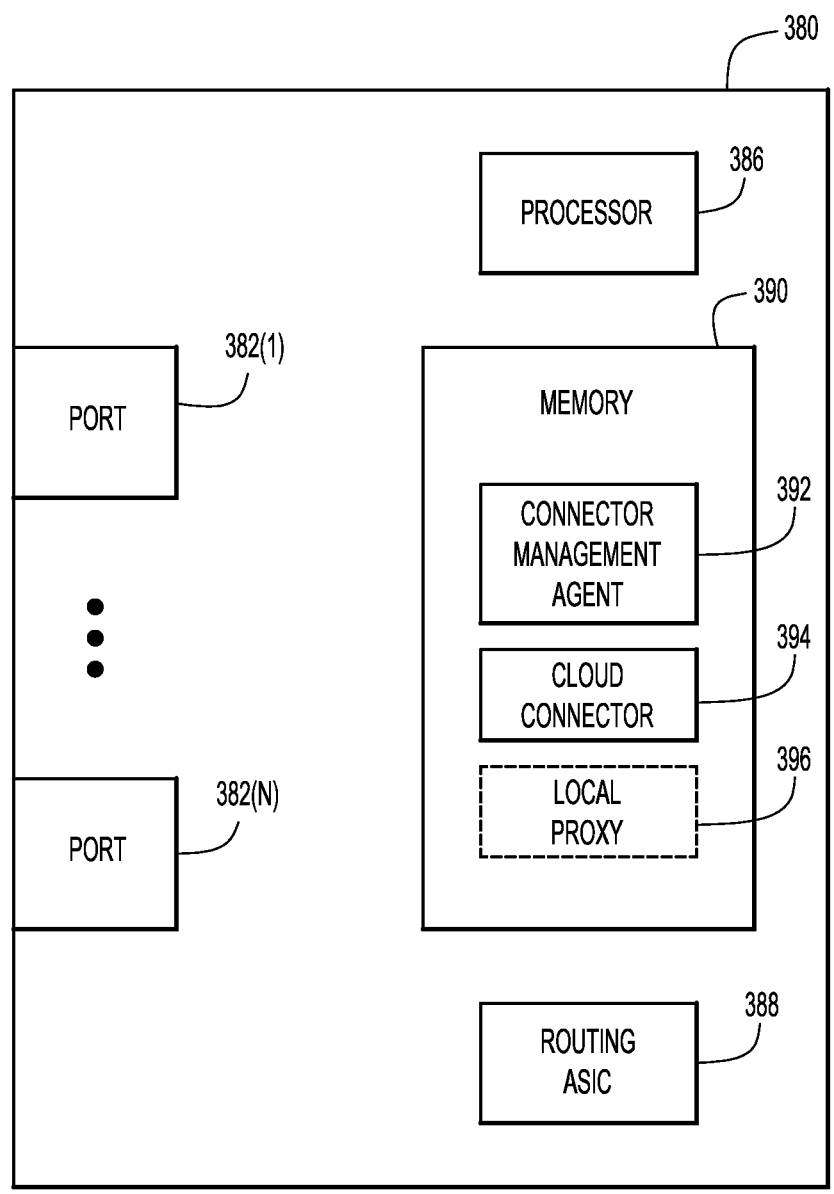
FIG. 5 is a block diagram of an on-premises node configured to implement zero-downtime upgrade techniques for a cloud connector, according to an example embodiment.

FIG. 5 is a block diagram of an on-premises node 380 configured to implement the zero-downtime upgrade techniques in accordance with examples presented herein. As noted above, on-premises nodes in accordance with examples presented herein may have a number of different arrangements. Merely for ease of illustration, FIG. 5 illustrates an arrangement in which the on-premises node is a basic router.

In the example of FIG. 5, the router 380 comprises a plurality of ports 382(1)-384(N), a processor 386, a routing application specific integrated circuit (ASIC) 388, and a memory 390. The routing ASIC 388 is a hardware device that performs various packet forwarding/routing operations. Memory 390 stores instructions for one or more software modules including a connector management agent 392, a cloud connector 394, and local proxy 396. The local proxy 396 is shown using dashed lines to indicate that it is present only in arrangements having incoming local communications on or more of the ports 382(1)-384(N).

The memory 390 may be read only memory (ROM), random access memory (RAM), magnetic disk storage media devices, optical storage media devices, flash memory devices, electrical, optical, or other physical/tangible memory storage devices. Thus, in general, the memory 390 may comprise one or more tangible (non-transitory) computer readable storage media (e.g., a memory device) encoded with software comprising computer executable instructions and when the software is executed (by the processor 386) it is operable to perform the operations described herein. In particular, the router 380 is configured to perform the operations described above in connection with FIGS. 1-4 when executing the software stored in memory 390.

Figure 6:
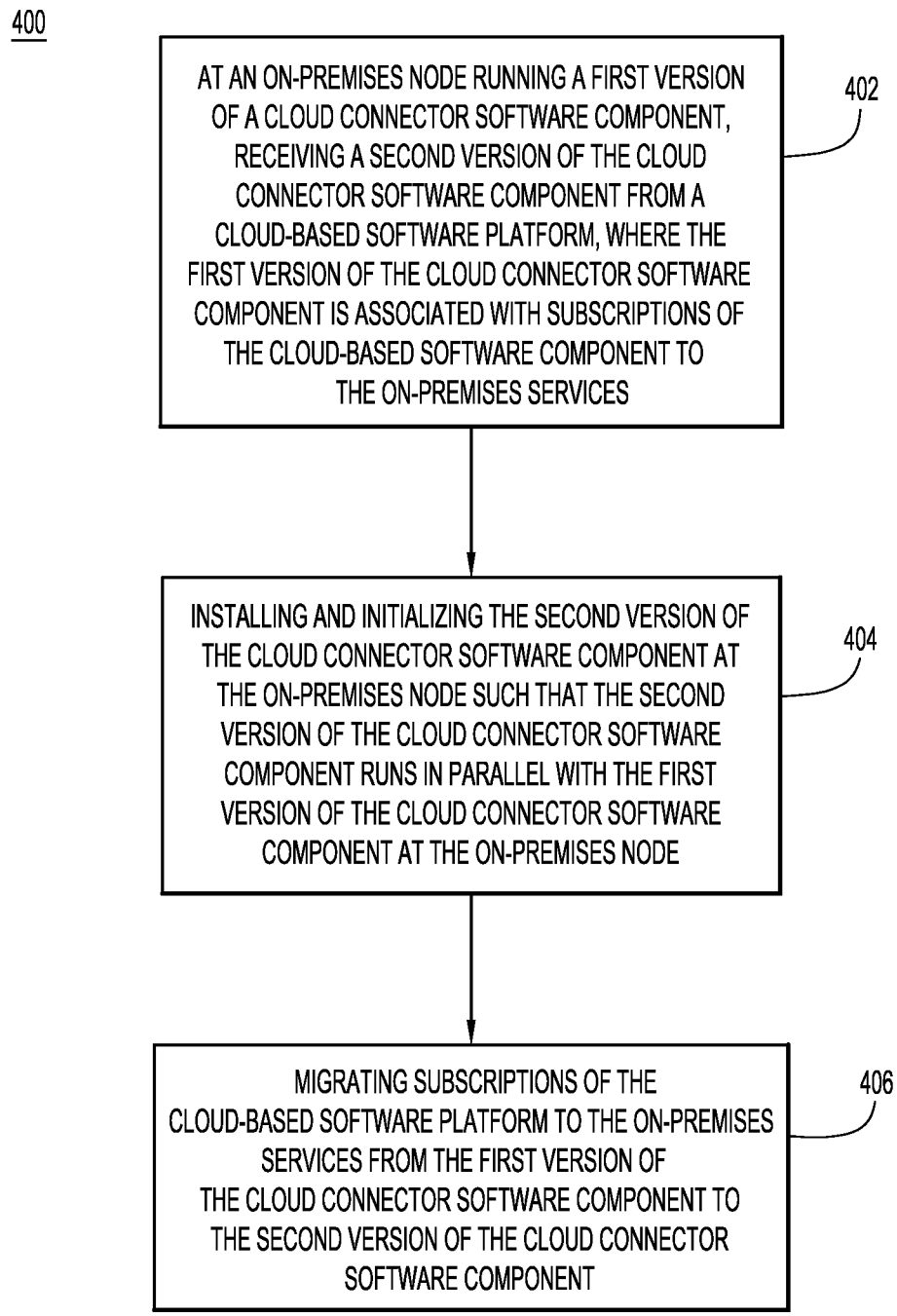
FIG. 6 is a high level flowchart of a method for performing zero-downtime upgrade techniques for a cloud connector, according to an example embodiment.

FIG. 6 is a high level flowchart of a method 400 in accordance with examples presented herein. Method 400 begins at 402 where an on-premises node running a first version of a cloud connector software component, receives a second version of the cloud connector software component from a cloud-based software platform. The first version of the cloud connector software component is associated with subscriptions of the cloud-based software platform to on-premises services. At 404, the second version of the cloud connector software component is installed and initiated at the on-premises node such that the second version of the cloud connector software component runs in parallel with the first version of the cloud connector software component at the on-premises node. At 406, the subscriptions of the cloud-based software platform to the on-premises services are transferred from the first version of the cloud connector software component to the second version of the cloud connector software component.

In accordance with certain examples, a method is provided. The method comprises: at an on-premises node running a first version of a cloud connector software component, receiving a second version of the cloud connector software component from a cloud-based software platform, where the first version of the cloud connector software component is associated with subscriptions of the cloud-based software platform to on-premises services; installing and initializing the second version of the cloud connector software component at the on-premises node such that the second version of the cloud connector software component runs in parallel with the first version of the cloud connector software component at the on-premises node; and migrating subscriptions of the cloud-based software platform to the on-premises services from the first version of the cloud connector software component to the second version of the cloud connector software component.

In accordance with certain examples, an apparatus is provided. The apparatus comprises: at least one network interface port; a memory comprising a first version of a cloud connector software component; and a processor configured to: run the first version of a cloud connector software component, where the first version of the cloud connector software component is associated with subscriptions of a cloud-based software platform to on-premises services, receive second version of the cloud connector software component from the cloud-based software platform via the at least one network interface port, install and initialize the second version of the cloud connector software component such that the second version of the cloud connector software component runs in parallel with the first version of the cloud connector software component; and migrate, under the control of the cloud-based software platform, subscriptions of the cloud-based software platform to the on-premises services from the first version of the cloud connector software component to the second version of the cloud connector software component.

In accordance with certain examples, one or more non-transitory computer readable storage media encoded with instructions are provided. The instructions, when executed by a processor, cause the processor to: at an on-premises node running a first version of a cloud connector software component, receive a second version of the cloud connector software component from a cloud-based software platform, where the first version of the cloud connector software component is associated with subscriptions of the cloud-based software platform to on-premises services; install and initialize the second version of the cloud connector software component at the on-premises node such that the second version of the cloud connector software component runs in parallel with the first version of the cloud connector software component at the on-premises node; and migrate subscriptions of the cloud-based software platform to the on-premises services from the first version of the cloud connector software component to the second version of the cloud connector software component.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    at an on-premises node running a first version of a cloud connector software component, receiving a second version of the cloud connector software component from a cloud-based software platform, where the first version of the cloud connector software component is associated with subscriptions of the cloud-based software platform to on-premises services;
    installing and initializing the second version of the cloud connector software component at the on-premises node such that the second version of the cloud connector software component runs in parallel with the first version of the cloud connector software component at the on-premises node;
    performing, via at least one message sent from the second version of the cloud connector software component to the cloud-based software platform, end-to-end verification of the second version of the cloud connector software component, wherein the end-to-end verification is configured to confirm that the second version of the cloud connector software component can communicate with both the cloud-based software platform and the on-premises services, and
    determining whether subscriptions of the cloud-based software platform to the on-premises services should be migrated from the first version of the cloud connector software component to the second version of the cloud connector software component in response to performing the end-to-end verification of the second version of the cloud connector software component.

2. The method of claim 1, wherein performing the end-to-end verification comprises determining that the end-to-end verification was successful such that the second version of the cloud connector software component can communicate with both the cloud-based software platform and the on-premises services; and further comprising:
    migrating the subscriptions from the first version of the cloud connector software component to the second version of the cloud connector software component.

3. The method of claim 1, wherein performing the end-to-end verification comprises determining that the end-to-end verification was unsuccessful such that the second version of the cloud connector software component cannot communicate with at least one of the cloud-based software platform or the on-premises services; and further comprising:
    preventing migration of the subscriptions from the first version of the cloud connector software component to the second version of the cloud connector software component.

4. The method of claim 2, wherein the migrating the subscriptions is orchestrated by the cloud-based software platform.

5. The method of claim 2, further comprising a local proxy of the on premises node processing traffic received from the on-premises services for forwarding to the cloud-based software platform via the first version of the cloud connector software component or the second version of the cloud connector software component, and dynamically directing local inbound traffic to one of the first version of the cloud connector software component or the second version of the cloud connector software component during migration of the subscriptions from the first version of the cloud connector software component to the second version of the cloud connector software component.

6. The method of claim 5, further comprising:
    following installing and initializing the second version of the cloud connector software component at the on-premises node, registering a local port address of the second version of the cloud connector software component with the local proxy.

7. The method of claim 6, further comprising deregistering a local port address of the first version of the cloud connector software component with the local proxy.

8. An apparatus comprising:
    at least one network interface port;
    a memory comprising a first version of a cloud connector software component; and
    a processor configured to:
        run the first version of the cloud connector software component, where the first version of the cloud connector software component is associated with subscriptions of a cloud-based software platform to on-premises services,
        receive second version of the cloud connector software component from the cloud-based software platform via the at least one network interface port,
        install and initialize the second version of the cloud connector software component such that the second version of the cloud connector software component runs in parallel with the first version of the cloud connector software component;
        perform, via at least one message sent from the second version of the cloud connector software component to the cloud-based software platform, end-to-end verification of the second version of the cloud connector software component, wherein the end-to-end verification is configured to confirm that the second version of the cloud connector software component can communicate with both the cloud-based software platform and the on-premises services, and
        determine whether subscriptions of the cloud-based software platform to the on-premises services should be migrated from the first version of the cloud connector software component to the second version of the cloud connector software component in response to performing the end-to-end verification of the second version of the cloud connector software component.

9. The apparatus of claim 8, wherein the processor is configured to:
   determine that the end-to-end verification was successful such that the second version of the cloud connector software component can communicate with both the cloud-based software platform and the on-premises services; and
   migrate the subscriptions from the first version of the cloud connector software component to the second version of the cloud connector software component when it is determined that the second version of the cloud connector software component can communicate with both the cloud-based software platform and the on-premises services.

10. The apparatus of claim 8, wherein the processor is configured to:
    determine that the end-to-end verification was unsuccessful such that the second version of the cloud connector software component cannot communicate with at least one of the cloud-based software platform or the on-premises services; and
    prevent migration of the subscriptions from the first version of the cloud connector software component to the second version of the cloud connector software component.

11. The apparatus of claim 9, wherein the processor is further configured to execute a local proxy that is configured to process traffic received from the on-premises services for forwarding to the cloud-based software platform via the first version of the cloud connector software component or the second version of the cloud connector software component, and to dynamically direct local inbound traffic to one of the first version of the cloud connector software component or the second version of the cloud connector software component during migration of the subscriptions from the first version of the cloud connector software component to the second version of the cloud connector software component.

12. The apparatus of claim 11, wherein following installing and initializing the second version of the cloud connector software component, the processor is configured to register a local port address for the second version of the cloud connector software component with the local proxy.

13. The apparatus of claim 12, wherein the processor is configured to deregister a local port address for the first version of the cloud connector software component with the local proxy.

14. One or more non-transitory computer readable storage media encoded with instructions that, when executed by a processor, cause the processor to:
    at an on-premises node running a first version of a cloud connector software component, receive a second version of the cloud connector software component from a cloud-based software platform, where the first version of the cloud connector software component is associated with subscriptions of the cloud-based software platform to on-premises services;
    install and initialize the second version of the cloud connector software component at the on-premises node such that the second version of the cloud connector software component runs in parallel with the first version of the cloud connector software component at the on-premises node;
    perform, via at least one message sent from the second version of the cloud connector software component to the cloud-based software platform, end-to-end verification of the second version of the cloud connector software component, wherein the end-to-end verification is configured to confirm that the second version of the cloud connector software component can communicate with both the cloud-based software platform and the on-premises services, and
    determine whether subscriptions of the cloud-based software platform to the on-premises services should be migrated from the first version of the cloud connector software component to the second version of the cloud connector software component in response to performing the end-to-end verification of the second version of the cloud connector software component.

15. The transitory computer readable storage media of claim 14, further comprising instructions that, when executed by a processor, cause the processor to:
    determine that the end-to-end verification was successful such that the second version of the cloud connector software component can communicate with both the cloud-based software platform and the on-premises services; and
    migrate the subscriptions from the first version of the cloud connector software component to the second version of the cloud connector software component only when it is determined that the second version of the cloud connector software component can communicate with both the cloud-based software platform and the on-premises services.

16. The transitory computer readable storage media of claim 14, further comprising instructions that, when executed by a processor, cause the processor to:
    determine that the end-to-end verification was unsuccessful such that the second version of the cloud connector software component cannot communicate with at least one of the cloud-based software platform or the on-premises services; and
    prevent migration of the subscriptions from the first version of the cloud connector software component to the second version of the cloud connector software component.

17. The non-transitory computer readable storage media of claim 15, wherein migration of the subscriptions is orchestrated by the cloud-based software platform.

18. The non-transitory computer readable storage media of claim 15, wherein the instructions cause the processor of the on-premises node to invoke a local proxy configured to process traffic received from the on-premises services for forwarding to the cloud-based software platform via the first version of the cloud connector software component or the second version of the cloud connector software component, and to dynamically direct local inbound traffic to one of the first version of the cloud connector software component or the second version of the cloud connector software component during migration of the subscriptions from the first version of the cloud connector software component to the second version of the cloud connector software component.

19. The non-transitory computer readable storage media of claim 18, further comprising instructions that, when executed by a processor, cause the processor to:
    following install and initialization of the second version of the cloud connector software component at the on-premises node, register a local port address of the second version of the cloud connector software component with the local proxy.

20. The non-transitory computer readable storage media of claim 19, further comprising instructions that, when executed by a processor, cause the processor to deregister a local port address of the first version of the cloud connector software component with the local proxy.

\* \* \* \* \*